United States Patent
Rump

(10) Patent No.: US 10,222,447 B2
(45) Date of Patent: Mar. 5, 2019

(54) METHOD FOR LOCATING A SOUND SOURCE, AND HUMANOID ROBOT USING SUCH A METHOD

(71) Applicant: ALDEBARAN ROBOTICS, Paris (FR)

(72) Inventor: Grégory Rump, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 178 days.

(21) Appl. No.: 15/025,539

(22) PCT Filed: Sep. 29, 2014

(86) PCT No.: PCT/EP2014/070783
§ 371 (c)(1),
(2) Date: Apr. 28, 2016

(87) PCT Pub. No.: WO2015/049199
PCT Pub. Date: Apr. 9, 2015

(65) Prior Publication Data
US 2016/0274212 A1    Sep. 22, 2016

(30) Foreign Application Priority Data

Oct. 1, 2013 (FR) ..................................... 13 59515

(51) Int. Cl.
*G01S 3/808* (2006.01)
(52) U.S. Cl.
CPC .................. *G01S 3/8083* (2013.01)
(58) Field of Classification Search
CPC ............................. G01S 3/808; G01S 3/8083
See application file for complete search history.

(56) References Cited

U.S. PATENT DOCUMENTS 8,073,690 B2 * 12/2011 Nakadai .................. G10L 15/20
704/233
9,318,124 B2 * 4/2016 Hiroe .................. G10L 21/0216
(Continued)

FOREIGN PATENT DOCUMENTS

EP          1 818 909 A1    8/2007
JP          2002-513979 A   5/2002

OTHER PUBLICATIONS

Dmochowski et al: "Fast steered response power source localization using inverse mapping of relative delays", Acoustics, Speech and Signal Processing, 2008. ICASSP 2008. IEEE International (Year: 2008).*

(Continued)

*Primary Examiner* — Isam A Alsomiri
*Assistant Examiner* — Amie M Ndure
(74) *Attorney, Agent, or Firm* — Baker & Hostetler LLP

(57) ABSTRACT

A method for locating a sound source by maximizing a directed response strength calculated for a plurality of vectors of the interauricular time differences forming a set comprises: a first subset of vectors compatible with sound signals from a single sound source at an unlimited distance from the microphones; and a second subset of vectors not compatible with sound signals from a signal sound source at an unlimited distance from the microphones. Each vector of the first subset is associated with a direction for locating the corresponding single sound source, and each vector of the second subset is associated with the locating direction of a vector of the first subset closest thereto according to a predefined metric. A humanoid robot including: a set of at least three microphones, arranged on a surface higher than the head of thereof; and a processor for implementing one such method is provided.

10 Claims, 7 Drawing Sheets

(56) References Cited

U.S. PATENT DOCUMENTS

| | | | |
|---|---|---|---|
| 2008/0071540 A1* | 3/2008 | Nakano | G10L 15/20 704/251 |
| 2008/0167869 A1* | 7/2008 | Nakadai | G10L 15/20 704/233 |
| 2012/0263315 A1* | 10/2012 | Hiroe | G10L 21/0216 381/92 |

OTHER PUBLICATIONS

J. DiBiase et al., "Robust Localization in Reverberant Rooms," Microphone Arrays: Signal Processing Techniques and Applications, 2001, Berlin, Germany, pp. 157-180.

C. H. Knapp et al., "The Generalized Correlation Method for Estimation of Time Delay," IEEE Transaction on Acoustics, Speech and Signal Processing, vol. ASSP-24, No. 4, Aug. 1976, pp. 320-327.

* cited by examiner

METHOD FOR LOCATING A SOUND SOURCE, AND HUMANOID ROBOT USING SUCH A METHOD

CROSS-REFERENCE TO RELATED APPLICATIONS

This application is a National Stage of International patent application PCT/EP2014/070783, filed on Sep. 29, 2014, which claims priority to foreign French patent application No. FR 1359515, filed on Oct. 1, 2013, the disclosures of which are incorporated by reference in their entirety.

FIELD OF THE INVENTION

The invention relates to a method for finding the spatial localization of a sound source, and to a humanoid robot able to implement and use such a method.

It is necessary to find the spatial localization of a sound source in many applications, especially, but not exclusively, in humanoid robotics.

BACKGROUND

A robot may be qualified humanoid provided that it possesses certain attributes of the appearance and functionalities of a human: a head, a trunk, two arms, optionally two legs, etc. Generally, it is required that a humanoid robot be able to interact with human beings as "naturally" as possible, by sensing the presence of a person, by understanding his language, by engaging him in conversation, etc. The ability to be able to localize sound sources is very useful, or even necessary, to achieve this aim. Specifically, such an ability may allow a humanoid robot to determine the direction from which a sound is coming and to turn his head in that direction; if the sound was produced by a person, the robot may then activate a face recognition software package, configure optimally a voice recognition system, follow with "his gaze" the movements of this person, etc.

A plurality of methods and systems for finding the spatial localization of a plurality of sound sources are known in the prior art. These methods and systems are generally based on a plurality of microphones that are not or not very directional and on digital processing of the signals captured by said microphones.

The paper by J. DiBiase et al. "Robust localization in reverberant rooms" in "Microphone Arrays: Signal Processing Techniques and Applications" edited by M. S. Brandstein and D. B. Ward by Springer-Verlag, 2001, Berlin, Germany, describes three principal approaches to localizing a sound source.

A first approach uses spectral estimation techniques based on the correlation matrix of the signals captured by the microphones. Methods based on this approach tend to be sensitive to modelling errors and very demanding of computational power. They are mainly suitable for narrow-band signals.

A second approach is based on the estimation of time shifts between the sound signals received by pairs of microphones ("Time Difference Of Arrival" or TDOA techniques). These estimations are used, with the knowledge of the positions of the microphones, to calculate hyperbolic curves, the intersection of which gives the position of the source. The time shifts may especially be estimated by the PHAT-GCC (for "Phase Transform—Generalized Cross-Correlation") method, which exploits the calculation of an intercorrelation—or cross correlation—between signals previously "whitened" by filtering. The PHAT-GCC method is described in more detail in the paper by Ch. H. Knapp and G. C. Carter "The Generalized Correlation Method for Estimation of Time Delay", IEEE Transaction on Acoustics, Speech and Signal Processing, Vol. ASSP-24, No. 4, August 1976 pp. 320-327. These methods are computationally light but they are not robust to correlated noise originating from multiple sources and are subject to "false positives". Furthermore, they are not very robust to reverberation, with the exception of the PHAT-GCC method.

A third approach consists in synthesizing an orientable acoustic beam by adding the signals captured by the various microphones, to which signals a variable time shift has been applied, and in identifying the orientation of the beam that maximizes the power of the composite signal thus received. Methods based on this approach tend to be not very robust to reverberation and noise, excepting certain variants that are however very demanding of computational power.

The paper more particularly describes a method combining the synthesis of an orientable acoustic beam and a generalized intercorrelation with phase transformation. This method is denoted SRP-PHAT (for "Steered Response Power—PHAse Transform"). Relative to the PHAT-GCC method, it is more robust to noise but more sensitive to reverberation.

SUMMARY OF THE INVENTION

The invention aims to provide a method for localizing a sound source having better immunity properties both to noise and to reverberation relative to known-prior art methods, while being sufficiently light from the computational point of view to be implemented in an on-board system such as a humanoid robot, in real-time and parallel to other tasks.

According to the invention, this aim is achieved by a method that is a derivative of the aforementioned SRP-PHAT method and by a humanoid robot including means for implementing this derivative method.

One subject of the invention is therefore a method for localizing a sound source including the following steps:

a) capturing sound signals issued from a sound source to be localized by means of an array of at least three microphones;

b) selecting at least three pairs of microphones from said array and, for each said pair, calculating a generalized intercorrelation of the captured sound signals, said calculation being carried out for a plurality of values of a delay—called the interauricular time difference—between said sound signals;

c) from said generalized intercorrelations, calculating a steered response power expressed as a function of a vector of the interauricular time differences for each said pair of microphones;

d) determining the interauricular time difference vector that maximizes said steered response power; and e) estimating a localization direction of said sound source depending on the interauricular time difference vector determined in step d), characterized in that:

said steps c) and d) are implemented by considering a plurality of interauricular time difference vectors forming a set that comprises: a first subset of vectors compatible with sound signals originating from a single sound source at infinite distance from said microphones; and a second subset of vectors that are not compatible with sound signals originating from a single source at infinite distance from said microphones; in that:

each vector of said first subset is associated with a localization direction of the corresponding single sound source, and each vector of said second subset is associated with the localization direction associated with a vector of said first subset that is closest thereto according to a predefined metric; and in that:

the direction estimated in said step e) is that associated with the interauricular time difference vector determined in said step d).

According to advantageous features of such a method:

The generalized intercorrelations calculated in said step b) may be of the GCC-PHAT type, corresponding to the intercorrelation of previously whitened signals.

In said step b), all the pairs of microphones of said array may be selected.

Said steered response power may be given by, or proportional to, the sum of the generalized intercorrelations for said pairs of microphones.

Said first subset may consist of the vectors of said set the components of which meet what is referred to as the Chasles condition:

$$\tau_{ij} + \tau_{jk} = \tau_{ik}$$

where the indices i≠j≠k represent various microphones of said array and $\tau_{ij}$, $\tau_{jk}$ and $\tau_{ik}$ represent the interauricular time differences for the pairs (i,j), (j,k) and (i,k), respectively.

Said second subset may consist of the vectors of said set not belonging to said first subset and the distance of which to a vector of said first subset, which distance is determined according to said predefined metric and after normalization, is below a predefined threshold.

Said predefined metric may be a Euclidean metric.

Said step e) may be implemented by means of a lookup table associating one localization direction with each value of said set.

Another subject of the invention is a humanoid robot comprising:

an array of at least three microphones; and a processor connected to said microphones in order to receive as input sound signals captured by the latter, said processor being programmed or configured to implement a method according to one of the preceding claims.

Advantageously, said microphones may be arranged on an upper surface of a head of said robot.

BRIEF DESCRIPTION OF THE DRAWINGS

Other features, details and advantages of the invention will become more clearly apparent on reading the description given with reference to the appended drawings, which are given by way of example and show, respectively.

DETAILED DESCRIPTION

Figure 1:
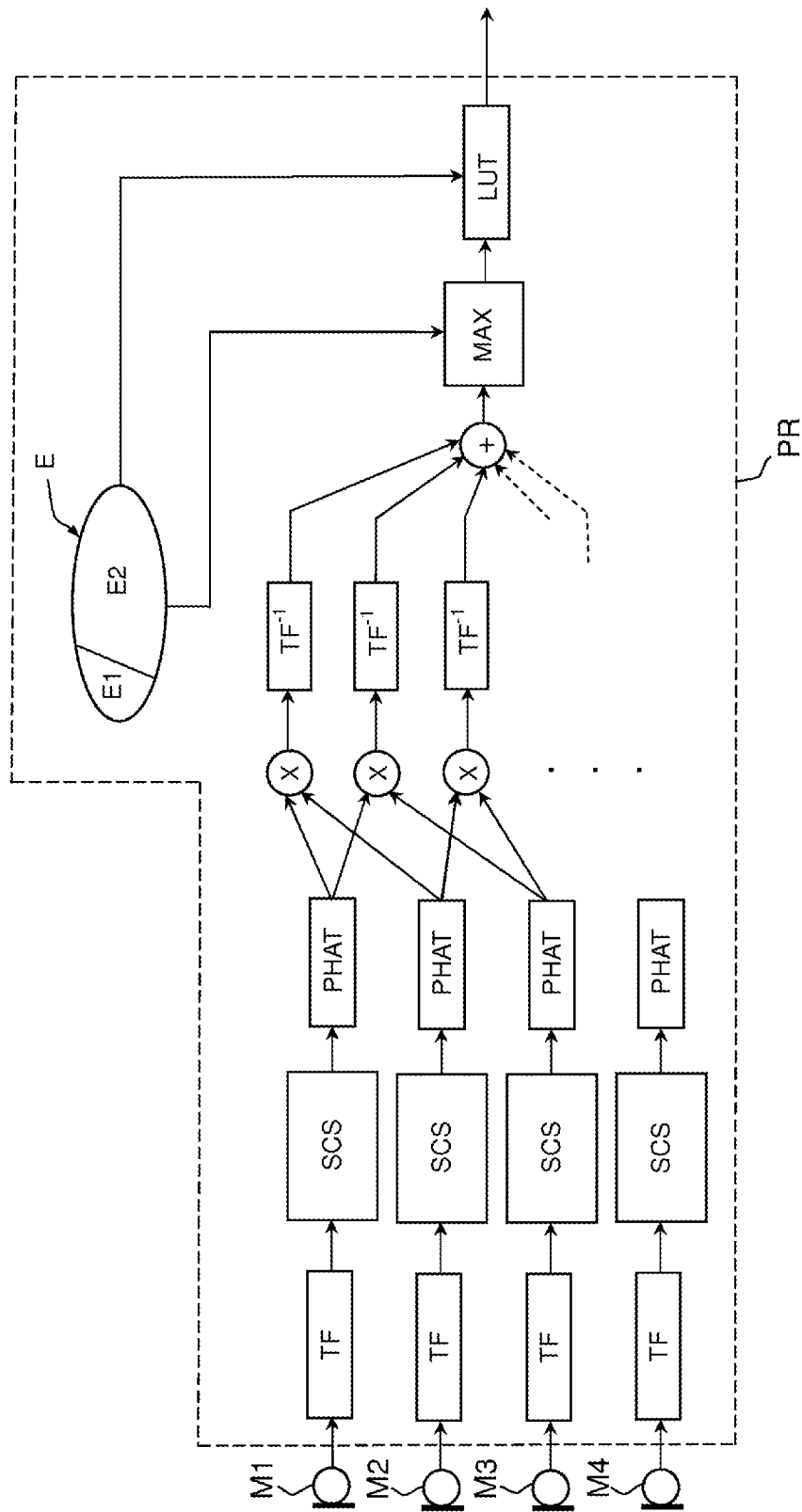
FIG. 1, a block diagram illustrating the implementation of a method according to one embodiment of the invention.

FIG. 1 very schematically illustrates the implementation of a method according to one embodiment of the invention by means of a system comprising a network of microphones M1-M4 and a processor PR.

In the case in the figure, the network comprises four microphones, but their number may be smaller (three at least) or larger; furthermore, although the microphones are shown aligned, they may have any spatial arrangement. Preferably, an arrangement will be chosen which minimizes the cases of masking, i.e. cases in which an obstacle gets between the microphones and the regions of space in which a sound source to be localized may be located.

An actual system would also comprise circuits for conditioning signals issued by the microphones, ensuring their amplification, filtering, sampling and analog/digital conversion. These circuits are omitted for the sake of simplicity and readability of the figure. Below therefore the microphones M1-M4 will be considered to deliver signals in digital format.

The processor PR is programmed or configured to carry out the following operations:

1. Calculation of a Generalized Intercorrelation of the Signals Issued from the Various Microphones, and Especially a Generalized Intercorrelation of GCC-PHAT Type.

Let $s_i(t)$ and $s_j(t)$ be the signals issued from the microphones $M_i$ and $M_j$ (i,j=1-4; i≠j). The generalized intercorrelation $R_{si,sj}$ of the signals is defined as the intercorrelation between the signals after prior filtering; it is a question of a function of a variable τ having units of time and representative of a time shift between the signals issued from the two microphones (interauricular time difference). Advantageously, the generalized intercorrelation is calculated in the frequency domain:

$$R_{si,sj}(\tau) = \int_{-\infty}^{+\infty} \Phi_i(\omega) S_i(\omega) \Phi_j^*(\omega) S_j^*(\omega) e^{i\omega\tau} d\omega \qquad (1)$$

where $S_{i,j}(\omega)$ is the Fourier transform of the signal $s_{i,j}(t)$, "*" is the complex conjugation operator and $\Phi(\omega)$ is the transfer function of a filter. In the case of a GCC-PHAT generalized intercorrelation, a filter that "whitens" the signals, i.e. equalizes the intensity of all their spectral components in order to preserve only phase information, is chosen:

$$\Phi_{i,PHAT} = \frac{1}{|S_i(\omega)|} \qquad (2)$$

Of course, in a practical embodiment of the method the Fourier transforms will be discrete Fourier transforms calculated e.g. by a fast Fourier transform (FFT) algorithm and the integrals will be replaced by sums of a finite number of terms.

Thus, as illustrated in FIG. 1, the signals issued from the microphones $M_1$-$M_4$ are converted into the frequency domain (FT blocs performing a discrete Fourier transform, e.g. using a fast Fourier transform or "FFT" algorithm), undergo thresholding to suppress spectral components the intensity of which is below a predefined value in order to prevent spectral components containing mainly or exclusively noise from being amplified by the whitening filter (spectral thresholding block SCS) and then are filtered by said whitening filter PHAT—but other types of filters may be used, see the aforementioned paper by Ch. H. Knapp and G. C. Carter. Next, the filtered signals are multiplied pairwise and their products are reconverted into the time domain (FT$^{-1}$ blocks performing an inverse discrete Fourier transform, especially using the fast Fourier transform or "FFT" algorithm). Thus, the generalized intercorrelations of the sound signals captured by the various microphones are obtained, considered pairwise. It was chosen to treat signals from all the pairs of microphones—of N(N−1)/2 in number if N is the number of microphones—but it could have been chosen to limit consideration to three pairs chosen therefrom, or any number of pairs comprised between 3 and N(N−1)/2.

The conversion into and out of the frequency domain is not absolutely necessary to calculate the intercorrelations, but nevertheless is very advantageous.

Since the calculations are carried out discretely, each generalized intercorrelation is calculated only for a discrete set of values of the interauricular time difference.

2. Calculation of a Steered Response Power (SRP).

This calculation is carried out simply by adding the various generalized intercorrelations:

$$SRP(\tau) = \Sigma_{si,sj} R_{si,sj}(\tau_{si,sj}) \quad (3)$$

where the sum is calculated for M pairs of signals $s_i, s_j$ associated with respective pairs of microphones (3≤M≤N(N−1)/2). The vectorial variable τ has M components, each corresponding to the interauricular time difference for one said pair. More generally, the SRP could be defined as a linear combination of the generalized intercorrelations.

It should be noted that all the values of τ—and therefore all the combinations of values $\tau_{si,sj}$, are not "physically possible". Specifically, if the case is considered of a single source that is sufficiently far away from the network of microphones that the acoustic waves reaching the latter may be considered to be plane, the localization direction of said source is completely identified by two interauricular time differences. In other words, two components of the vector τ unequivocally define (at least in theory) the values of the other components.

3. Maximization of the Steered Response Power

The localization direction of the sound source is identified by maximizing the function SRP(τ) relative to the vectorial variable τ. A number of numerical methods may be used to solve this optimization problem; mention may be made by way of nonlimiting example of gradient algorithms and "brute force" methods.

This maximization could be carried out under constraints, by taking into account only the values of τ that are "physically possible" in the sense explained above, i.e. compatible with sound signals originating from a single source at "infinite" distance. This approach is in particular known from the aforementioned paper by J. H. DiBiase et al. However, in practice, it proves to be not very robust. Specifically, because of noise, masking effects (obstacles getting between the source and one or more microphones) and, above all, reverberation effects, it is frequent for the absolute maximum of SRP(τ) to correspond to an "impossible" value of τ.

According to the invention, in order to improve the robustness of the algorithm for finding the spatial localization of the source, the search for the maximum of SRP(τ) is not carried out only among the "possible" values of τ, but also among theoretically inadmissible values, i.e. values incompatible with sound signals originating from a signal source at "infinite" distance. More precisely, as indicated in FIG. 1, the function SRP(τ) is maximized (functional block "MAX") by considering values of the vector τ that form a set E made up of two subsets:

A first subset E1 of vectors τ compatible with sound signals originating from a single sound source at infinite distance from the network of microphones. From the mathematical point of view, these vectors have components that meet what are referred to as "Chasles" conditions $$\tau_{ij} + \tau_{jk} = \tau_{ik} \quad (4)$$

where the indices i≠j≠k represent various microphones of said array and $\tau_{ij}$, $\tau_{jk}$ and $\tau_{ik}$ represent the interauricular time differences for the pairs (i,j), (j,k) and (i,k), respectively. These conditions are necessary, but not sufficient, for a vector τ to be compatible with sound signals originating from a single sound source at infinite distance.

A second subset E2 of vectors τ that are not compatible with sound signals originating from a single sound source at infinite distance from the network of microphones. In particular, this second subset consists of the vectors of said set not belonging to said first subset and the distance of which to a vector of said first subset, which distance is determined according to a predefined (especially Euclidean) metric and after normalization (each vector is divided by its norm), is below a predefined threshold. This threshold is a way of regulating the method, and it may be determined experimentally.

The following procedure is used to select the vectors τ belonging to the set E is to attribute them E to the subsets E1 and E2.

Firstly, it is recommended to write, in matrix form, the system of equations that relates the unit vector pointing in the direction of the source, vector denoted x, to the vector of the interauricular time differences τ:

$$\tau = Ax \quad (5)$$

where A is an M×3 matrix (it will be recalled that M is the number of components of the vector τ). Since the matrix A is not square, it may not be inverted directly. If the microphones are not coplanar, the matrix A is of rank 3. It is then possible to choose three linearly independent rows to construct an invertible square matrix Ã; the three-dimensional vector obtained by taking the three components of τ corresponding to said independent components of the matrix A is denoted $\tilde{\tau}$. Thus:

$$\tilde{\tau} = \tilde{A}x \quad (6)$$

and therefore $$x = \tilde{A}^{-1}\tilde{\tau} \quad (7)$$

Next, a starting set E' of vectors τ, which corresponds to a sphere or a cube in $\mathbb{R}^M$ (because the modulus of τ or each of its components is given the maximum admissible value) which is discrete (because only discrete values of these components are considered).

For each vector τ of E', its projection $\bar{\tau}$ into the subspace of the vectors that respect the three-dimensional Chasles relationships are calculated. If the difference $d_1 = |\tau - \bar{\tau}|$ exceeds a predefined threshold ε, the vector is discarded. If not, the vector $\tilde{\tau}$ is extracted from $\bar{\tau}$ (i.e. the vector of its three linearly independent components) and the distance $d_2$ is calculated, given by:

$$d_2 = \left| \frac{\sqrt{\|\tilde{\tau}\| - d_1^2}}{\|x\|} - 1 \right| \quad (8)$$

Equation (8) indicates that by shortening the vector $\tilde{\tau}$ by the value $d_2$ without modifying its direction, $\tilde{\tau}$ becomes of unitary norm.

If $d = \sqrt{d_1^2 + d_2^2}$ is below the threshold ε, the vector τ therefore forms part of the set E (of the subset E1 if d=0 and of the subset E2 otherwise; however it will be noted that this distinction is not operational, all the vectors of the set E are treated in the same way).

Equation 7 allows each said vector to be associated with a localization direction of the source.

Since these calculations are very heavy, it is advantageous to carry them out only once, and to store the results in a lookup table (see below).

4. Identification of the Localization Direction of the Sound Source

After having identified the vector $\tau \in E$ that maximizes SRP($\tau$)—indicated by $\tau_{max}$, it is necessary to associate it with a localization direction of the sound source. If $\tau_{max} \in E1$, this is not a problem, because the vector of the interauricular times differences is then compatible with one and only one localization direction. If $\tau_{max} \in E2$, the localization direction compatible with the vector belonging to E1 that is closest to $\tau_{max}$ according to said predefined metric is chosen.

Advantageously, each vector of the set E is associated once and for all with a localization direction. Each vector of the set and the localization direction that is associated therewith are stored in a file loaded into a memory of the processor to form a lookup table, constructed in the way described above. Thus, the localization direction of the source is determined from the value of $\tau_{max}$ simply by reading from the table.

Advantageously, the file containing the lookup table is organized in the following way (considering vectors $\tau$ having six components):

| Index | Vector $\tau$ | (azimuth, elevation) | {neighbors} |
|---|---|---|---|
| 0 | (0, 6, 6, 6, 6, 0) | (0°, 30°) | {2, 3} |
| 1 | (0, 0, 0, 0, 0, 0) | (0°, 90°) | { } |
| 2 | (1, 6, 6, 6, 6, 0) | (3°, 28°) | {0, 3} |
| 3 | (1, 7, 6, 6, 6, 0) | (5°, 27°) | {0, 2} |

The index is not explicitly written in the file, it follows from the order. The "neighbors" field contains the indices of the vectors that have deviations smaller than or equal to 1 (or to another predefined value) in each of the components. This field serves to facilitate the implementation of a gradient algorithm for maximizing the SRP.

When the processor starts up, it loads into memory the content of the file containing the lookup table. Each time a sound is detected, it calculates SRP($\tau$) values for all the vectors $\tau$ stored in the lookup table, then seeks the maximum of these values, identifies the corresponding vector $\tau$ and reads from the lookup table the azimuth and elevation values that are associated therewith. As a variant, the processor could search for the N>1 highest local maxima of SRP($\tau$) in order to perform a multi-localization (simultaneous localization of a number of sources); but this approach proves to be not very robust.

The processor PR, the operation of which was illustrated using FIG. 1, may comprise an suitably programmed microprocessor coupled to one or more memories for storing the set E and the lookup table LUT. This microprocessor may be dedicated to localizing sound sources or also accomplish other tasks; at a pinch, it may be a question of the only processor of a portable or desktop computer or of a very simple robot. Likewise, the set E and the lookup table LUT may be stored in a dedicated memory unit or in a central memory. The processor may also comprise dedicated logic circuits, which may optionally be programmable.

Figure 2:
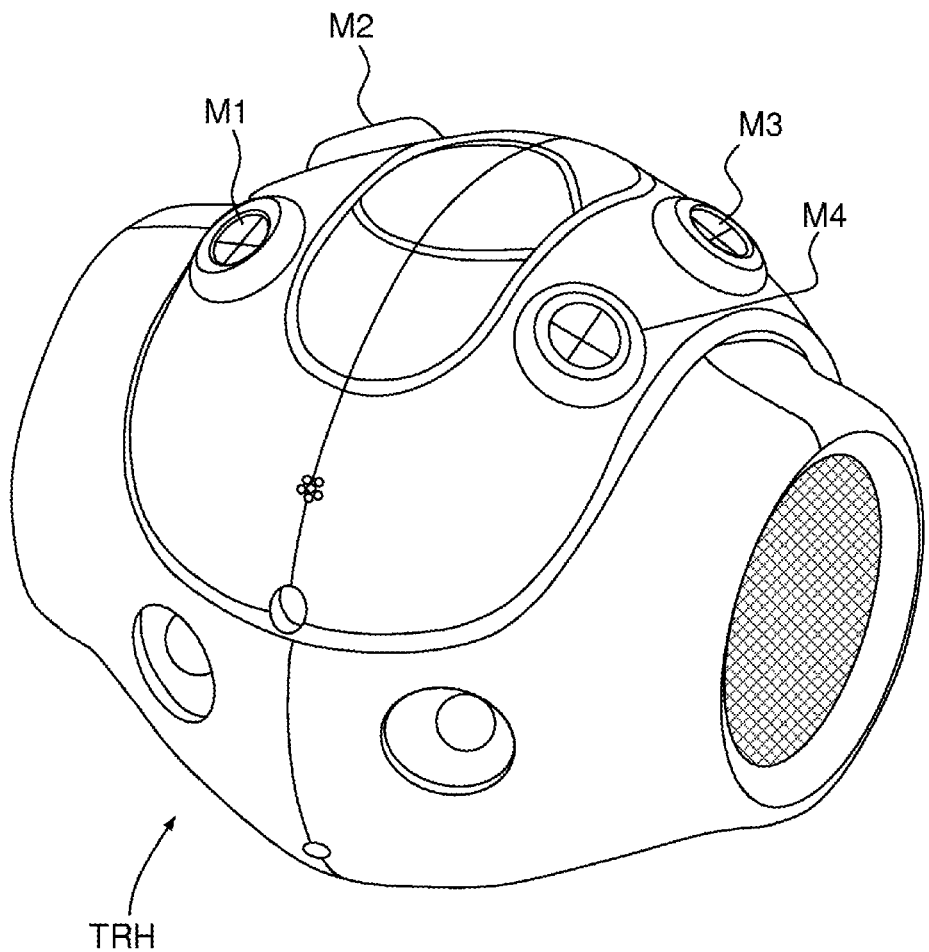
FIG. 2, the arrangement of the microphones on the head of a humanoid robot according to an embodiment of the invention.

FIG. 2 shows the head TRH of a humanoid robot suitable for implementing the invention, comprising a network of four microphones $M_1$-$M_4$ arranged on an upper surface of said head. This arrangement makes it possible to avoid any masking effect when the sound source is located at a height above that of the head of the robot. This is particularly recommended for detection and localization of a human interlocutor on the part of a humanoid robot having a size smaller than that of most human beings, for example between 50 and 150 cm. The distance between two adjacent microphones may be comprised by way of indication, between 3 and 30 cm.

The method of the invention has been tested by equipping with microphones, according to FIG. 2, a "Nao" robot produced by the applicant company. The robot and a sound source were placed in an ordinary room, exhibiting a "normal" reverberation, with the source arranged in front of the robot, on its right, on its left, to the right of straight in front (at an angle of −45° relative to a back-front axis) and to the left of straight in front (at an angle of +45° relative to a back-front axis). The sound source was a piece of sound reproducing equipment emitting vocal signals. The localization was carried out by considering calculation windows each of 1024 samples. A plurality of trials were repeated, and the localization directions determined by the robot (identified by an azimuth and an angle of elevation) were grouped together to form histograms.

Figure 3A:
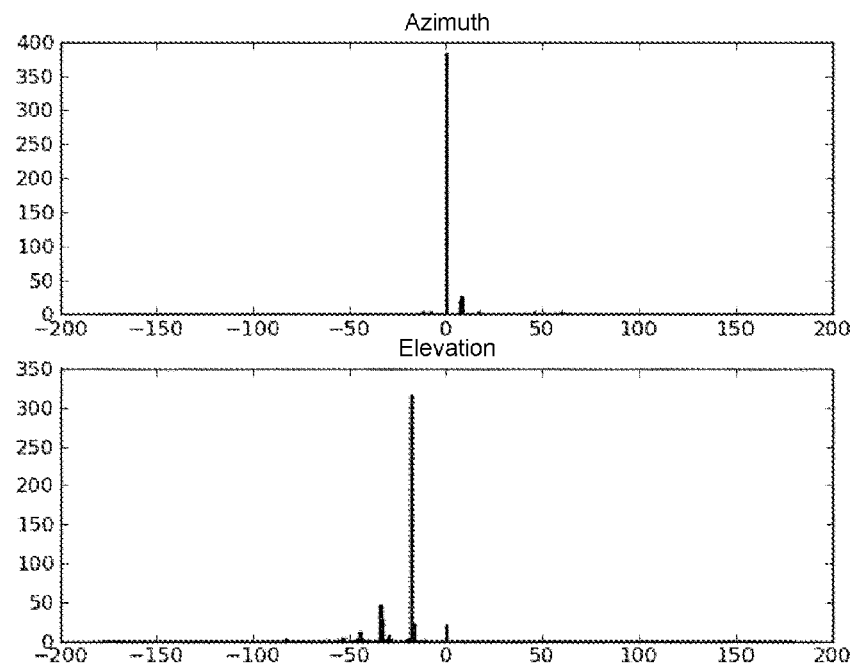
FIGS. 3A, 4A, 5A, 6A and 7A, graphs illustrating the performance of a method according to an embodiment of the invention.
Figure 3B:
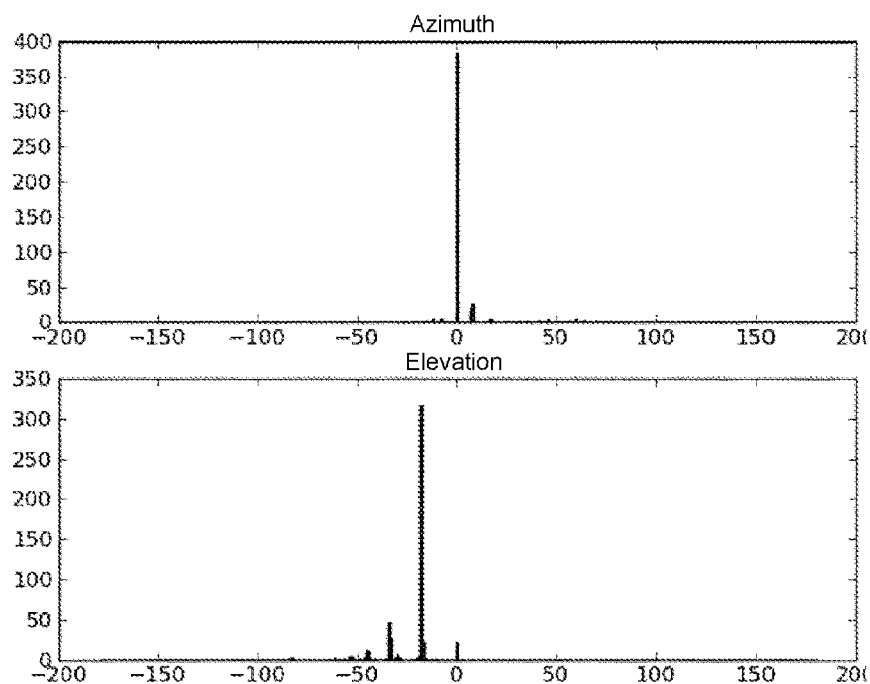
FIGS. 3B, 4B, 5B, 6B and 7B, given by way of comparison, graphs illustrating the performance of a method according to the prior art.

FIGS. 3A/3B correspond to a source localized in front of the robot (theoretical azimuth: 0°).

Figure 4A:
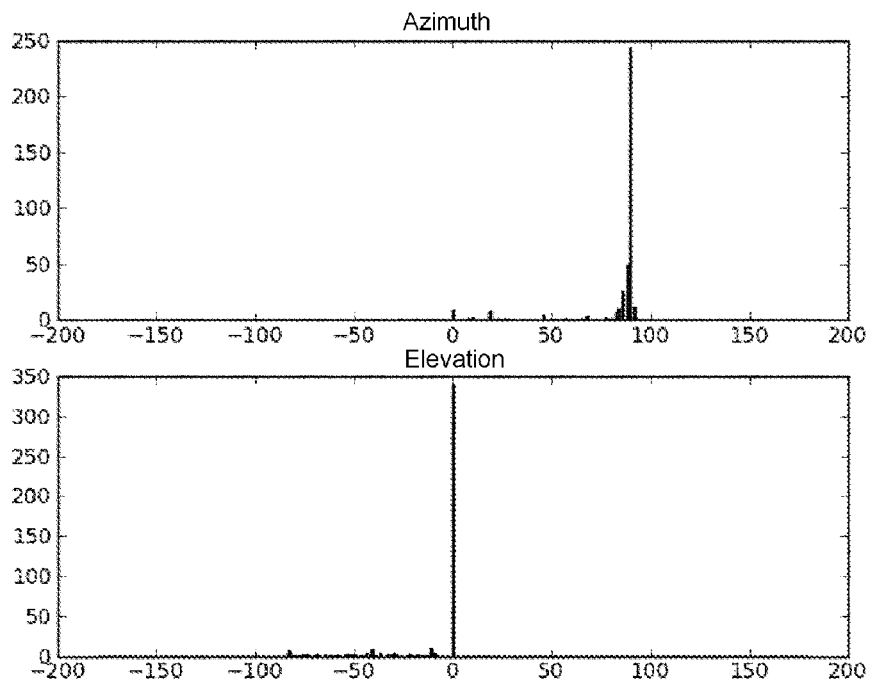
Figure 4B:
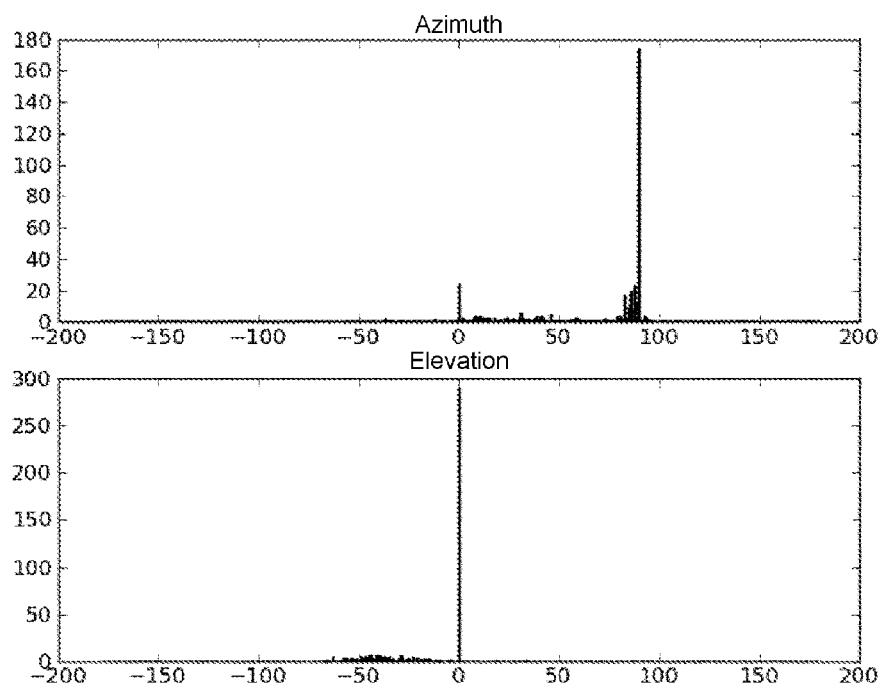

FIGS. 4A/4B correspond to a source localized to the left of the robot (nominal azimuth: 90°).

Figure 5A:
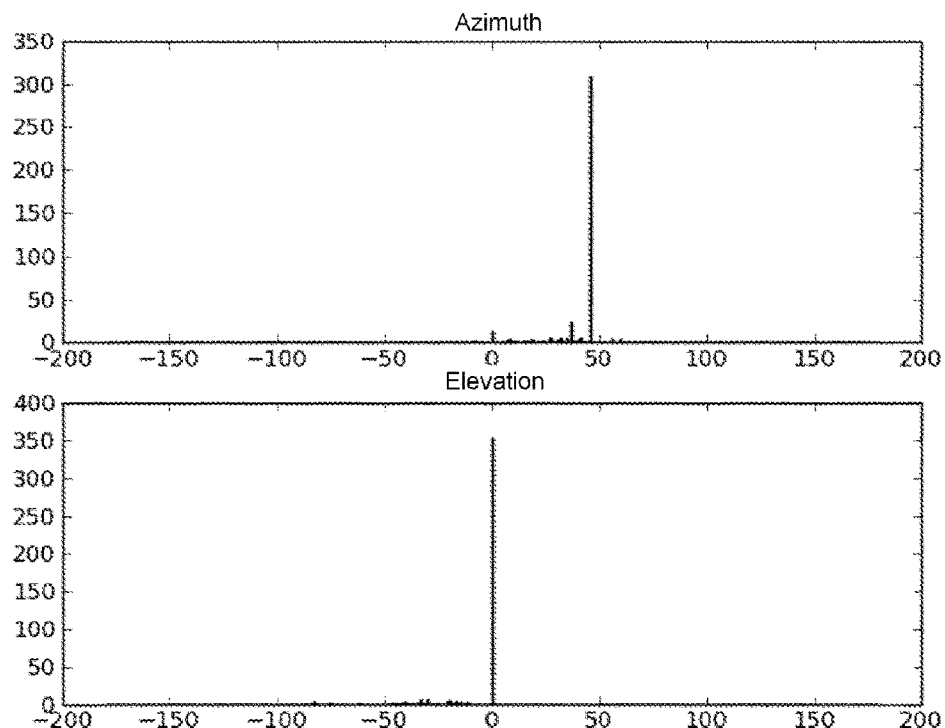
Figure 5B:
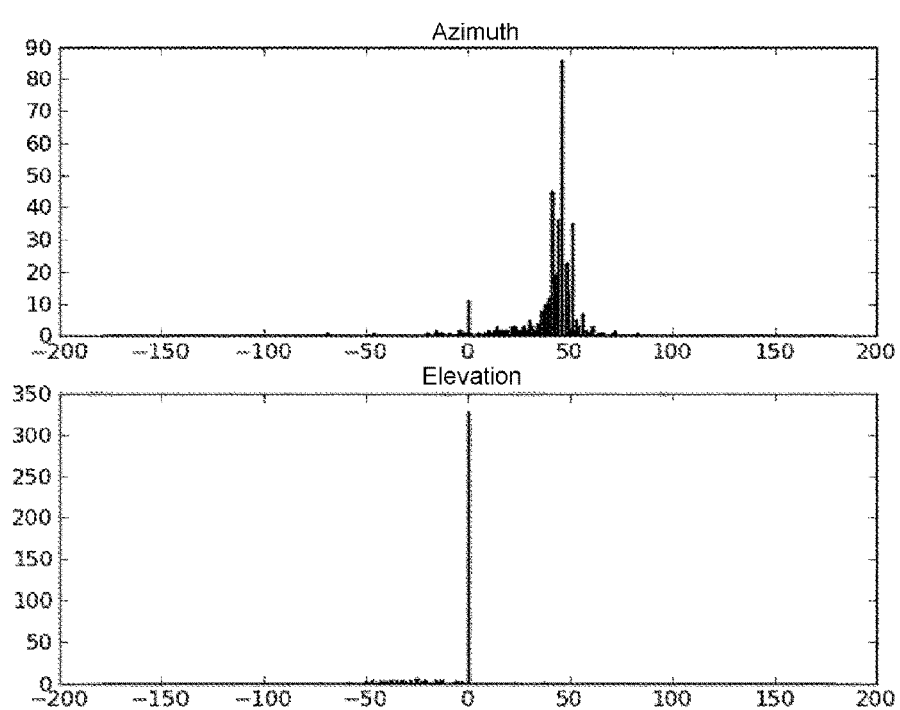

FIGS. 5A/5B correspond to a source localized to the left of straight in front of the robot (nominal azimuth: 45°).

Figure 6A:
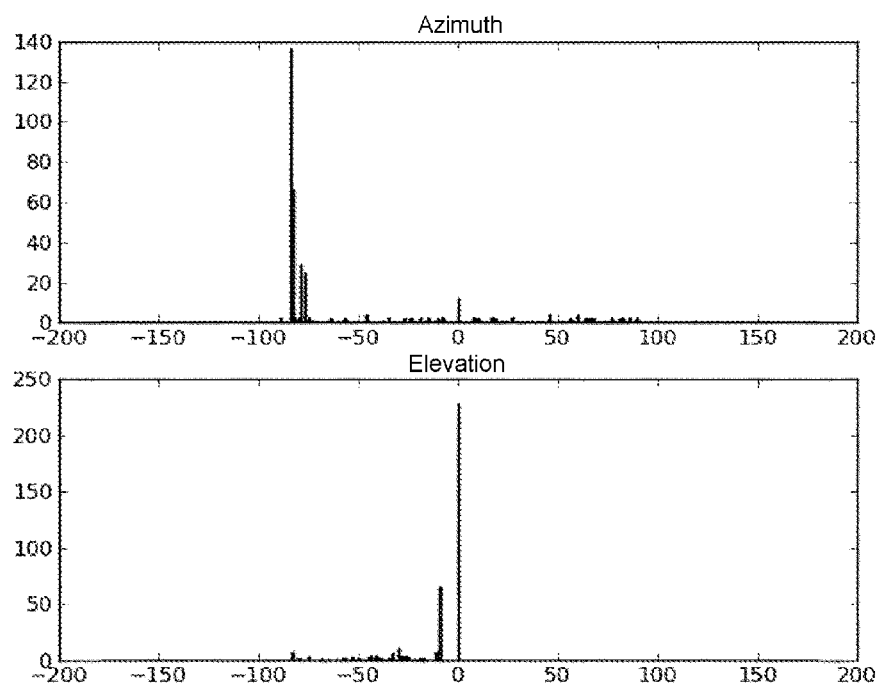
Figure 6B:
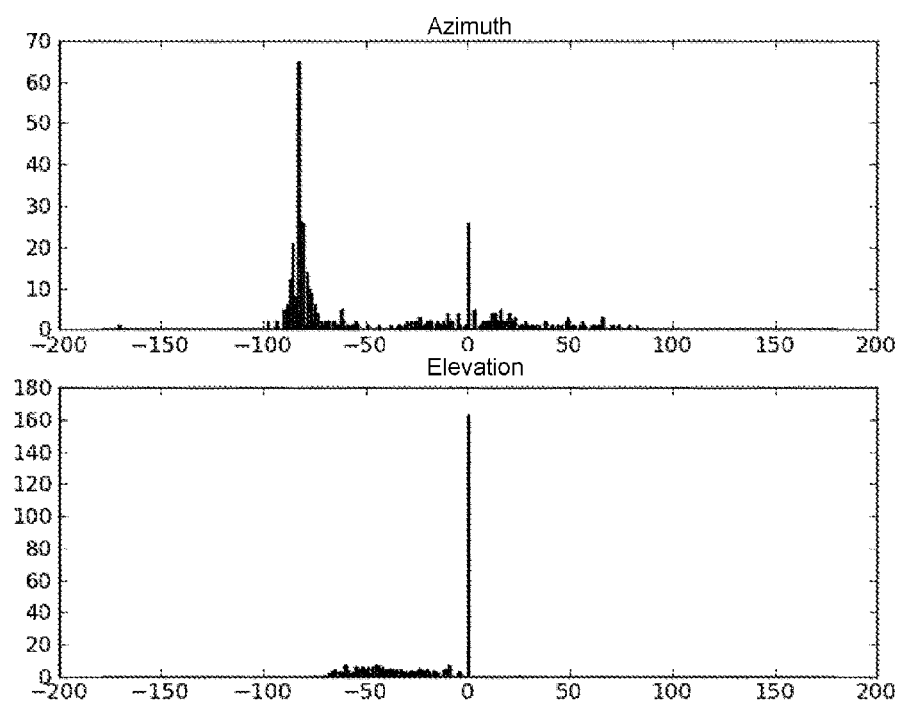

FIGS. 6A/6B correspond to a source localized to the right of the robot (nominal azimuth: −90°).

Figure 7A:
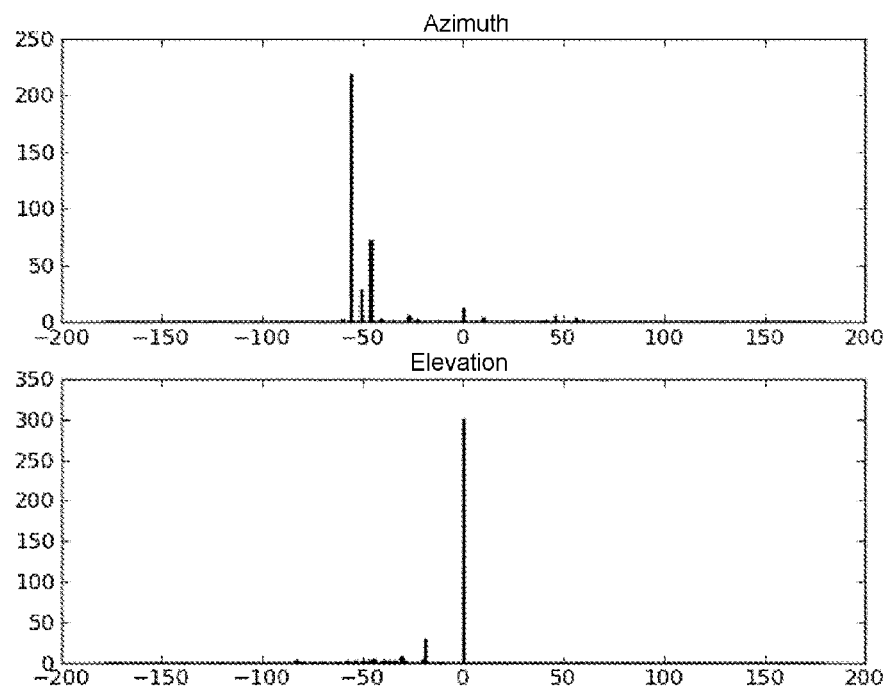
Figure 7B:
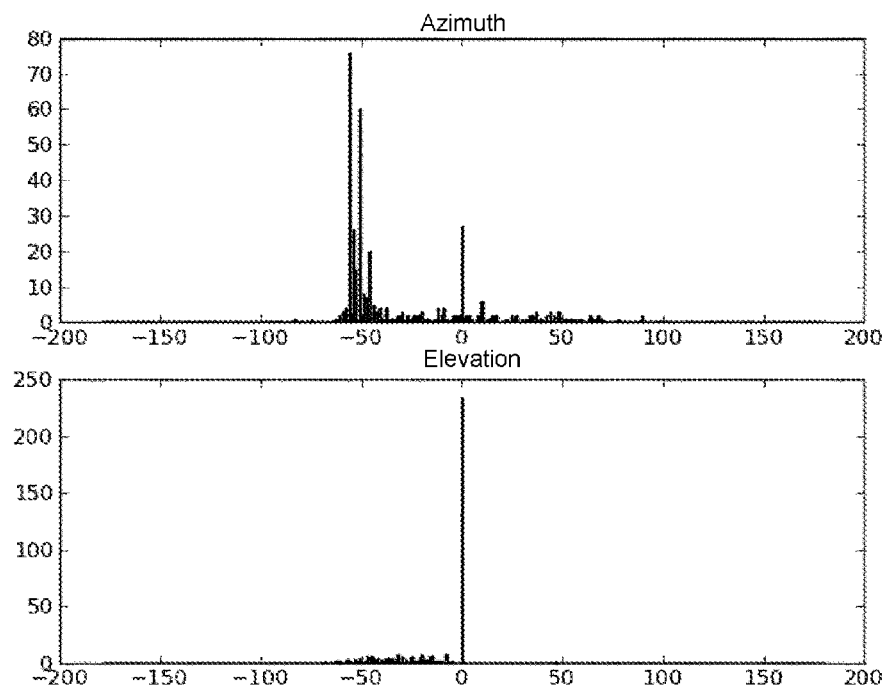

FIGS. 7A/7B correspond to a source localized to the right of straight in front of the robot (nominal azimuth: −45°).

Nominal elevation was not measured. Specifically in the robotic applications that are principally of interest, elevation is less important than azimuth.

The figures "A" relate to the method of the invention, such as described above. The figures "B" are given by way of comparison and were obtained by means of a conventional TDOA method. In this reference method, the localization was considered to have failed when the maximum normalized SRP value was below a predefined threshold. More generally, even in a method according to the invention, this normalized maximum value may be considered an indicator of confidence in the localization. The normalization is relative to:

$$\lambda = \sum_{s_i; s_{ij}} \sqrt{W(s_i) W(s_j)}$$

where $W(s_i)$ and $W(s_j)$ are the energies of the whitened signals issued from the microphones i and j.

It will be noted that, in the case of the invention (figures "A"), a large majority of the trials led to a satisfactory estimation, to within a few degrees, of the azimuth of the source, whereas the reference method (figures "B") had a quite high failure rate. It should be underlined that the robotic applications that are principally of interest do not require a high precision (a localization error of a few degrees is without impact), but rather a high robustness coupled with relative computational simplicity.

The invention claimed is:

1. A method for localizing a sound source, the method including the following steps:

a) capturing sound signals issued from a sound source to be localized by an array of at least three microphones;
b) selecting at least three pairs of microphones from said array and, for each of said pair, calculating a generalized intercorrelation of the sound signals, said calculation being carried out for a plurality of values of an interauricular time difference between said sound signals;
c) from said generalized intercorrelations, calculating a steered response power expressed as a function of a vector of the interauricular time differences for each of said pair of microphones;
d) determining the interauricular time difference vector that maximizes said steered response power; and
e) estimating a localization direction of said sound source depending on the interauricular time difference vector,
wherein said steps c) and d) are implemented by considering a plurality of interauricular time difference vectors forming a set that comprises: a first subset of vectors compatible with sound signals originating from a single sound source at infinite distance from said microphones; and a second subset of vectors that are not compatible with sound signals originating from a single source at infinite distance from said microphones;
wherein each vector of said first subset is associated with a localization direction of the corresponding single sound source, and each vector of said second subset is associated with the localization direction associated with a vector of said first subset that is closest thereto according to a predefined metric, and the direction estimated in said step e) is that associated with the interauricular time difference vector determined in said step d).

2. The method of claim 1, wherein the generalized intercorrelations are of the GCC-PHAT type and corresponding to the intercorrelation of previously whitened signals.

3. The method of claim 1, wherein, in said step b), all the pairs of microphones of said array are selected.

4. The method of claim 1, wherein said steered response power is given by, or proportional to, the sum of the generalized intercorrelations for said pairs of microphones.

5. The method of claim 1, wherein said first subset consists of the vectors of said set the components of which meet what is referred to as the Chasles condition:

$$\tau_{ij} + \tau_{jk} = \tau_{ik}$$

where the indices $i \neq j \neq k$ represent various microphones of said array and $\tau_{ij}$, $\tau_{jk}$ and $\tau_{ik}$ represent the interauricular time differences for the pairs (i,j), (j,k) and (i,k), respectively.

6. The method of claim 1, wherein said second subset consists of the vectors of said set not belonging to said first subset and the distance of which to a vector of said first subset, which distance is determined according to said predefined metric and after normalization, is below a predefined threshold.

7. The method of claim 1, wherein said predefined metric is a Euclidean metric.

8. The method of claim 1, wherein said step e) is implemented by means of a lookup table associating one localization direction with each value of said set.

9. A humanoid robot comprising:
an array of at least three microphones; and
a processor connected to said microphones in order to receive as input sound signals captured by the latter, said processor being programmed or configured to implement a method according to claim 1.

10. The humanoid robot of claim 9, wherein said microphones are arranged on an upper surface of a head of said robot.

* * * * *